No. 663,751. Patented Dec. 11, 1900.
A. G. GRENAMYER & G. A. ROBINSON.
FILTER.
(Application filed Sept. 6, 1900.)
(No Model.)
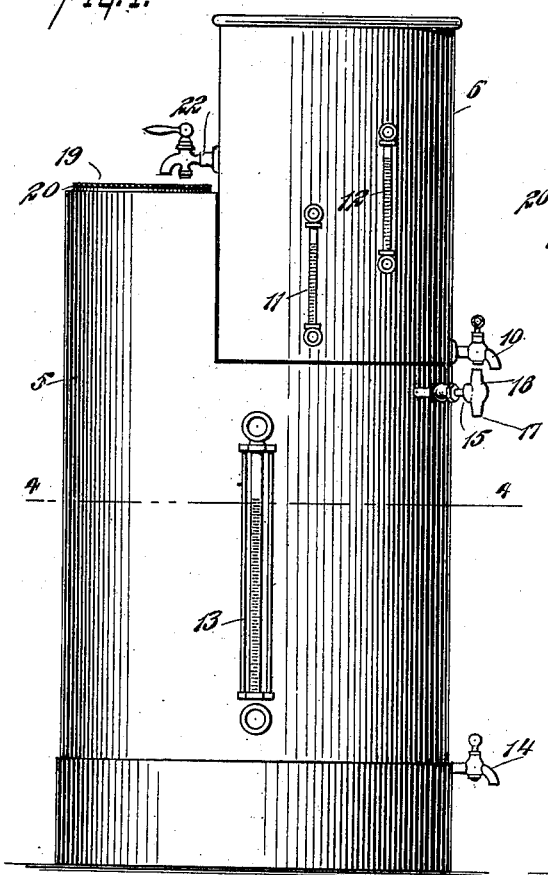
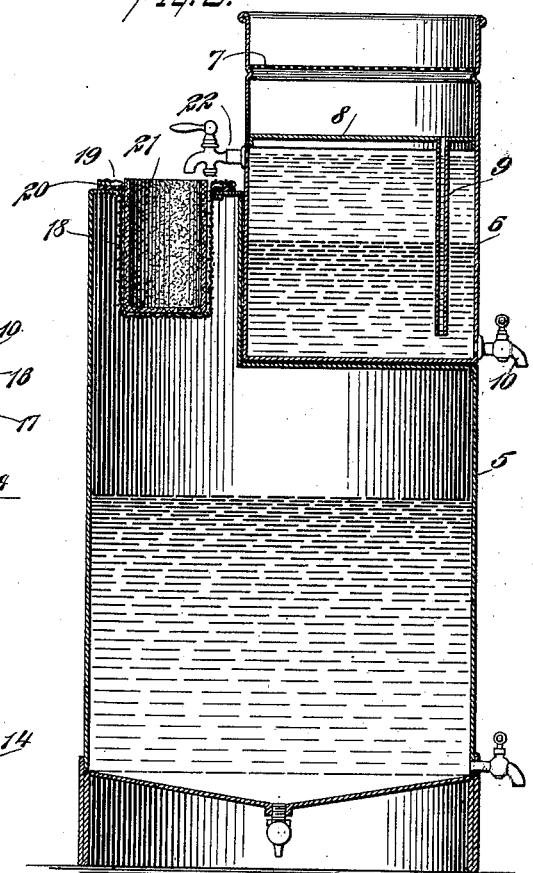
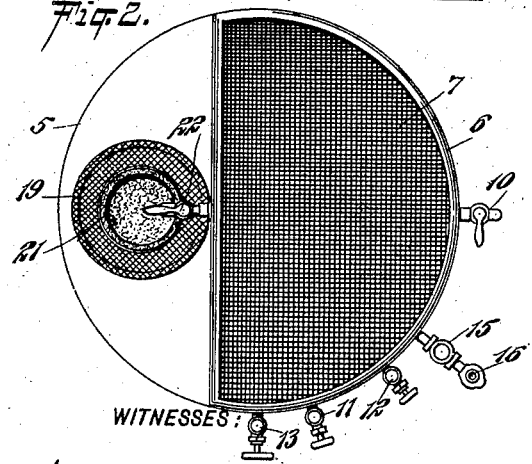
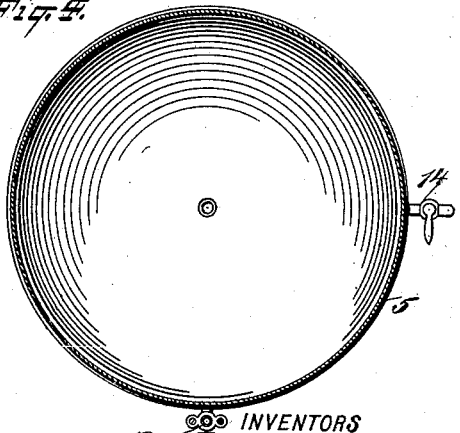
WITNESSES:
William P. Goebel
C. R. Ferguson
INVENTORS
Arthur G. Grenamyer,
George A. Robinson.
BY
ATTORNEYS

ID="UNITED STATES PATENT OFFICE."

UNITED STATES PATENT OFFICE.

ARTHUR G. GRENAMYER AND GEORGE A. ROBINSON, OF LEETONIA, OHIO.

FILTER.

SPECIFICATION forming part of Letters Patent No. 663,751, dated December 11, 1900.

Application filed September 6, 1900. Serial No. 29,178. (No model.)

*To all whom it may concern:*

Be it known that we, ARTHUR G. GRENAMYER and GEORGE A. ROBINSON, citizens of the United States, and residents of Leetonia, in the county of Columbiana and State of Ohio, have invented a new and Improved Filter, of which the following is a full, clear, and exact description.

This invention relates to improvements in filters for oil or other liquids; and the object is to provide a filter of simple construction in which the material may be very rapidly filtered, and, further, to provide a filter that shall be comparatively cheap to manufacture, that is not liable to get out of order, and that may be quickly and easily cleaned.

We will describe a filter embodying our invention and then point out the novel features in the appended claims.

Reference is to be had to the accompanying drawings, forming a part of this specification, in which similar characters of reference indicate corresponding parts in all the figures.

Figure 1 is a side elevation of a filter embodying our invention. Fig. 2 is a top view thereof. Fig. 3 is a vertical section, and Fig. 4 is a section on the line 4 4 of Fig. 1.

The filter comprises a tank 5 for receiving the filtered material. Arranged to be placed on this tank 5 is a receiving vessel 6, having near its upper open end a screen 7, and below this screen 7 is a horizontal partition 8, through which a pipe or tube 9 leads, the said pipe or tube extending nearly to the bottom of the receiving vessel. The upper portion of the tank is cut away at one side, and in this cut-away portion the receiving vessel is designed to be placed. The receiving vessel is provided with a stop-cock 10, through which water may be discharged from the vessel, and it is also provided with water and oil gages 11 and 12. The tank 5 is also provided with an oil-gage 13 and with an outlet-cock 14, through which the filtered oil may be drawn off.

At the upper portion of the tank is a vacuum-producer consisting of a steam-injector 15, as it is to be understood there shall be a partial vacuum in the tank. Steam for causing the vacuum may be entered at the upper end 16 and discharged at the lower end 17 of the vacuum-regulator.

Supported upon the top of the tank and extended into the same at one side of the receiving vessel is a basket 18 of any suitable material and having on its upper end a flange 19, which extends upon the top of the tank, and between this flange 19 and the top of the tank is a rubber gasket 20. A partial vacuum in the tank will cause the basket to be forced down tightly against the rubber gasket, so as to prevent any possible entrance of air.

Removably placed in the basket 18 is a filter material 21, which preferably consists of felt. This is made to correspond substantially to the shape of the basket and is closed at its sides and bottom.

In operation the oil containing water and impurities is poured upon the screen 7, and this screen will hold or take up all the coarser particles of dirt or the like, and the oil and water passing upon the partition 8 will flow through the tube 9 and be separated in the receiving vessel below the said partition, the oil of course rising to the top, as plainly indicated in Fig. 3. From the receiving vessel the oil is drawn off through the cock 22 and discharged into the filtering device 21, through which the oil percolates, leaving the dirt and other matter in this filter device 21.

When it is desired to filter oil drawn directly from a barrel, it may be siphoned from the barrel into the filtering device 21. The filtering device 21 may be renewed, or it may be removed and readily cleaned when desired, and obviously by removing the basket 18 the tank may be readily cleaned with water or other suitable material. As there is a partial vacuum in the tank 5, there is no danger of the oil overflowing the basket 18, as it will be forced out of the basket as fast as it can be poured in. In fact, this filter will work as fast as oil and water will separate.

Having thus described our invention, we claim as new and desire to secure by Letters Patent—

1. A filter, comprising a tank, a basket extended into the upper portion of the tank and having a flange portion projected upon the top of the tank, a packing or gasket arranged between said flange and the top, and a vacuum-regulator connected to the tank, substantially as specified.

2. A filter, comprising a tank, a basket removably supported in the upper portion thereof, a filter material of felt or the like removably placed in said basket, and a vacuum-regulator attached to the tank, substantially as specified.

3. A filter, comprising a tank, a receiving vessel removably placed on the tank, a screen in the upper portion of said receiving vessel, a partition below the screen, and a pipe leading through said partition and nearly to the bottom of the vessel, substantially as specified.

4. A filter, comprising a tank, a cup-shaped filter of felt or the like supported in the upper portion of said tank, a receiving vessel supported on the tank, a cock for discharging oil from said vessel into said filter, a screen in the upper portion of the receiving vessel, a partition in the vessel below the screen, and a tube leading through said partition into the receiving vessel, substantially as specified.

In testimony whereof we have signed our names to this specification in the presence of two subscribing witnesses.

ARTHUR G. GRENAMYER.
GEORGE A. ROBINSON.

Witnesses:
 JENNIE MOSSMAN,
 J. I. McMILLAN.